United States Patent
Mishra et al.

(10) Patent No.: US 7,721,007 B2
(45) Date of Patent: May 18, 2010

(54) METHODS OF TRANSMITTING NON-SCSI COMMANDS INVOLVING LOADING OPCODE IN COMMAND DESCRIPTOR BLOCK (CDB) BYTES AND NON-SCSI COMMANDS INTO REMAINING CDB BYTES

(75) Inventors: Ragendra Mishra, Fremont, CA (US); Narasimhulu Kotte, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 847 days.

(21) Appl. No.: 11/057,627

(22) Filed: Feb. 14, 2005

(65) Prior Publication Data

US 2006/0190645 A1    Aug. 24, 2006

(51) Int. Cl.
*G06F 3/00*    (2006.01)
*G06F 13/12*    (2006.01)
*G06F 13/38*    (2006.01)

(52) U.S. Cl. ............................................. 710/5; 710/71
(58) Field of Classification Search .................... 710/71, 710/5

See application file for complete search history.

(56) References Cited

U.S. PATENT DOCUMENTS

| | | | |
|---|---|---|---|
| 5,778,226 A | * | 7/1998 | Adams et al. ............... 719/311 |
| 6,018,779 A | * | 1/2000 | Blumenau ..................... 710/68 |
| 6,047,353 A | * | 4/2000 | Vishlitzky et al. ........... 711/111 |
| 7,200,698 B1 | * | 4/2007 | Rothberg ...................... 710/74 |
| 2003/0225564 A1 | * | 12/2003 | Zeidman ....................... 703/23 |
| 2004/0019706 A1 | * | 1/2004 | Smith ............................. 710/1 |

OTHER PUBLICATIONS

Robert C. Elliot et al., "Working Draft American Nation Statndard: Information technology-SCSI Block Commands- 2 (SBC-2)", revised Jun. 15, 2004,( web address http://110.org/ftp/t10/drafts/sbc2/sbc2r13.pdf ) Cover p. 5-9, 30, and 46-48.*
Wikipedia, "SCSI command", http://en.wikipedia.org/wiki/SCSI_command.*

* cited by examiner

*Primary Examiner*—Alford W Kindred
*Assistant Examiner*—Brooke J Dews
(74) *Attorney, Agent, or Firm*—Suiter Swantz pc llo

(57) ABSTRACT

The present invention provides a method for transmitting a non-SCSI command via a SCSI command. A CDB for the SCSI command is provided. The CDB includes bytes byte_0, byte_1, byte_2, . . . , byte_n, in which byte_0 includes an opcode for the SCSI command. An opcode for the non-SCSI command is loaded into byte_1. When the non-SCSI command is not greater than a fixed number of bytes, the non-SCSI command is loaded into at least one byte of the CDB, which includes byte_2. Data associated with the non-SCSI command is transmitted via a data phase associated with the SCSI command.

4 Claims, 4 Drawing Sheets

| byte_0 | byte_1 | byte_2 | byte_3 | byte_4 | byte_5 | byte_6 | byte_7 | byte_8 | byte_9 |
|---|---|---|---|---|---|---|---|---|---|
| 0x3B | Opcode | Context Information | | | | MSB<---Sizeof(Buffer)--->LSB | | | 1st Phase Signature |

500

| byte_0 | byte_1 | byte_2 | byte_3 | byte_4 | byte_5 | byte_6 | byte_7 | byte_8 | byte_9 |
|---|---|---|---|---|---|---|---|---|---|
| 0x3C | Opcode | Context Information | | | | MSB<---Sizeof(Buffer)--->LSB | | | 2nd Phase Signature |

550

METHODS OF TRANSMITTING NON-SCSI COMMANDS INVOLVING LOADING OPCODE IN COMMAND DESCRIPTOR BLOCK (CDB) BYTES AND NON-SCSI COMMANDS INTO REMAINING CDB BYTES

FIELD OF THE INVENTION

The present invention generally relates to the field of computer data storage, particularly to methods for transmitting non-SCSI commands via SCSI commands.

BACKGROUND OF THE INVENTION

SCSI (Small Computer System Interface) is a standard interface for transferring data between devices on a computer bus. To attach a computer to the host bus requires a SCSI host adapter which controls the data transfer on the SCSI bus; the peripheral side must feature a SCSI controller, which is generally embedded (i.e., integral to the peripheral) in SCSI devices. SCSI is most commonly used for hard disks and tape storage devices, but also connects a wide range of other devices, including scanners, CD-ROM drives, CD writers, and DVD drives.

In the context of computer data storage, Internet SCSI (iSCSI) uses the SCSI protocol over a TCP/IP network in the context of computer data storage. It enables a machine on an IP network (initiator) to contact a remote dedicated server (target) and perform block I/O (input/output) on the server just as it would with a local hard disk. Since an iSCSI target is a SCSI device, all the commands to the target have to be SCSI commands. However, some commands (e.g., management commands) to the target may be non-SCSI commands. Thus, it would be desirable to provide a method for transmitting a non-SCSI command between a SCSI iniator and a SCSI target.

SUMMARY OF THE INVENTION

In an exemplary aspect, the present invention provides a method for encapsulating a non-SCSI command in a SCSI command. A CDB (command descriptor block) for the SCSI command is provided. The CDB includes bytes byte_0, byte_1, byte_2, . . . , byte_n, in which byte_0 includes an opcode for the SCSI command. An opcode for the non-SCSI command is loaded into byte_1. When the non-SCSI command is not greater than a fixed number of bytes, the non-SCSI command is loaded into at least one byte of the CDB, which includes byte_2. Data associated with the non-SCSI command is transmitted via a data phase associated with the SCSI command.

In an additional exemplary aspect, the present invention provides a method for transmitting a non-SCSI read command via SCSI commands when the non-SCSI read command is greater than a fixed number of bytes. A first CDB is provided for a Write Buffer command. The first CDB includes context information. A non-SCSI read command is loaded in Writer Buffer Data of the Write Buffer command. A second CDB is provided for a Read Buffer command. The second CDB includes the context information, where the context information is used to correlate the first CDB and the second CDB. Data associated with the non-SCSI read command is loaded in Read Buffer Data of the Read Buffer command.

In another exemplary aspect, the present invention provides a method for transmitting a non-SCSI write command via SCSI commands when the non-SCSI write command is greater than a fixed number of bytes. A CDB is provided for a Write Buffer command. A non-SCSI write command and data associated with the non-SCSI write command are both loaded in Writer Buffer Data of the Write Buffer command.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
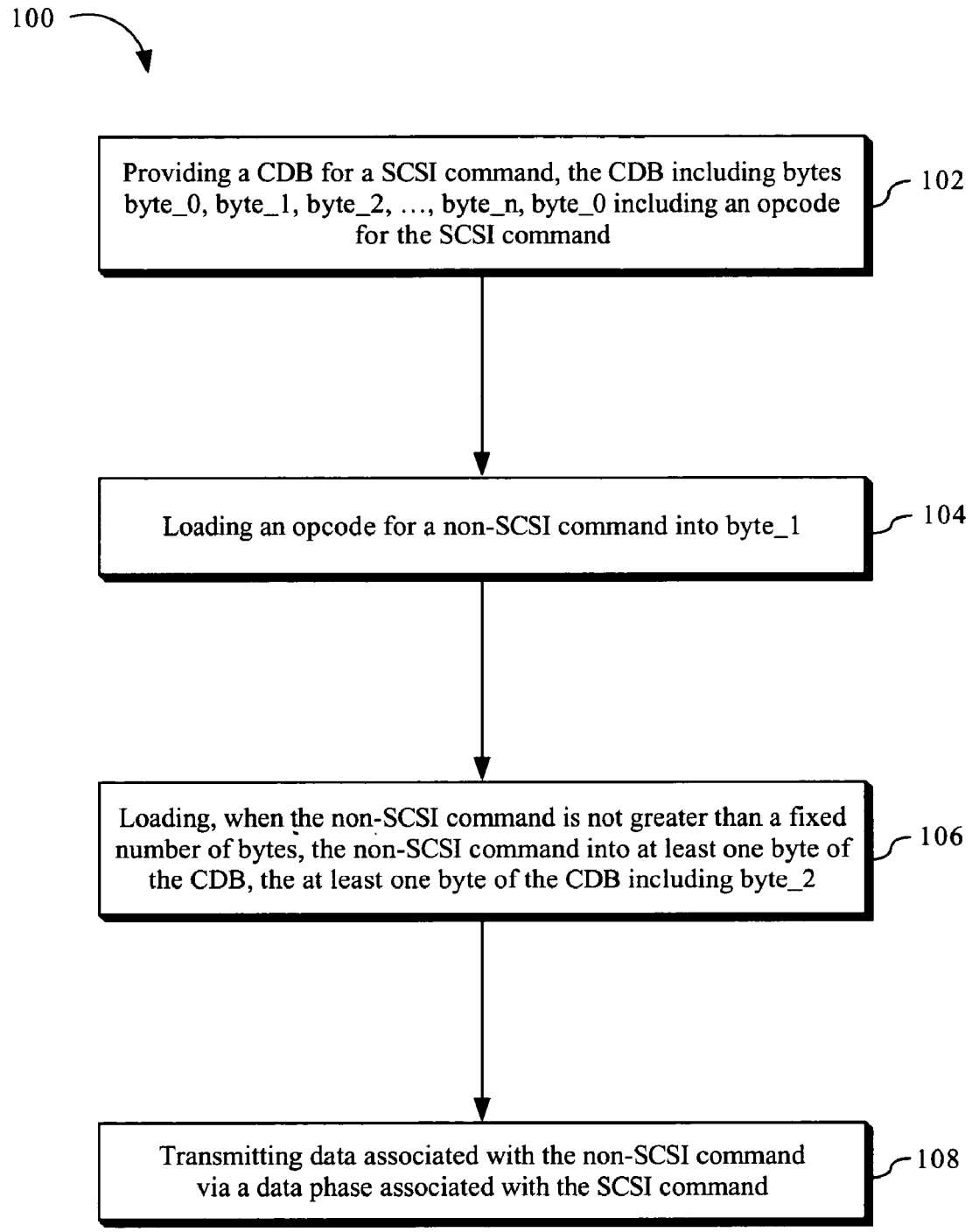
FIG. 1 is a flowchart of a method for encapsulating a non-SCSI command in a SCSI command in accordance with an exemplary embodiment of the present invention.

First referring to FIG. 1, a flowchart of a method 100 for encapsulating a non-SCSI command in a SCSI command in accordance with an exemplary embodiment of the present invention is shown. A CDB (command descriptor block) for the SCSI command is provided 102. The CDB includes bytes byte_0, byte_1, byte_2, . . . , byte_n, in which byte_0 includes an opcode for the SCSI command. The CDB may be a 10-byte CDB, a 12-byte CDB, or the like. Preferably, the SCSI command is a Write Buffer command or a Read Buffer command. An opcode for the non-SCSI command is loaded into byte_1 104. The non-SCSI command may be a management command or the like. When the non-SCSI command is not greater than a fixed number of bytes, the non-SCSI command is loaded into at least one byte of the CDB, which includes byte_2 106. Data associated with the non-SCSI command is transmitted via a data phase associated with the SCSI command 108.

Figure 2:
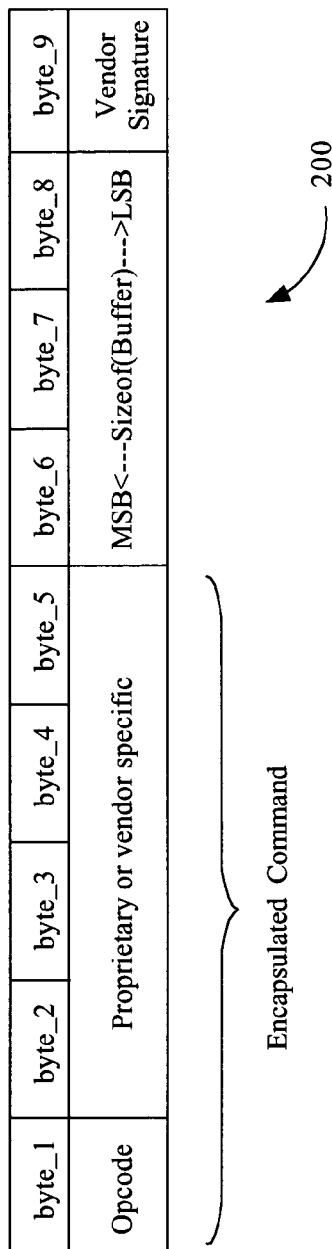
FIG. 2 is a schematic diagram illustrating a 10-byte CDB for a Write Buffer command which encapsulates a non-SCSI command in accordance with an exemplary embodiment of the present invention.

FIG. 2 is a schematic diagram illustrating a 10-byte CDB 200 for a Write Buffer command which encapsulates a non-SCSI command in accordance with an exemplary embodiment of the present invention. The method 100 shown in FIG. 1 may be implemented in the CDB 200. As shown, byte_0 of the CDB 200 includes an opcode 0×3 B for the Write Buffer command, and byte_1 includes an opcode for the encapsulated non-SCSI command. When the non-SCSI command is not greater than 4 bytes, byte_2 through byte_5 may be used to hold the non-SCSI command. For example, when the non-SCSI command is 1 byte, then byte_2 may hold the non-SCSI command, and byte_3 through byte_5 may hold don't-care-values. When the non-SCSI command is 2 bytes, then byte_2 and byte_3 may hold the non-SCSI command, and byte_4 and byte_5 may hold don't-care-values. When the non-SCSI command is 3 bytes, then byte_2 through byte_4 may hold the non-SCSI command, and byte_5 may hold a don't-care-value. When the non-SCSI command is 4 bytes, then byte_2 trough byte_5 may hold the non-SCSI command. Data associated with the non-SCSI command may be transmitted via Write Buffer Data of the Write Buffer command.

Figure 3:
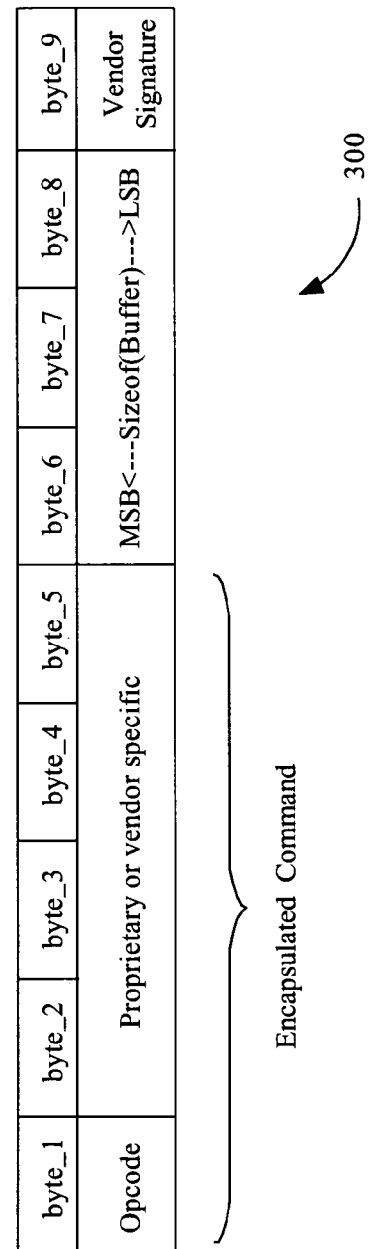
FIG. 3 is a schematic diagram illustrating a 10-byte CDB for a Read Buffer command which encapsulates a non-SCSI command in accordance with an exemplary embodiment of the present invention.

FIG. 3 is a schematic diagram illustrating a 10-byte CDB 300 for a Read Buffer command which encapsulates a non-SCSI command in accordance with an exemplary embodiment of the present invention. The method 100 shown in FIG. 1 may be implemented in the CDB 300. As shown, byte_0 of the CDB 300 includes an opcode 0×3 C for the Read Buffer command, and byte_1 includes an opcode for the encapsulated non-SCSI command. When the non-SCSI command is not greater than 4 bytes, byte_2 through byte_5 may be used to hold the non-SCSI command. For example, when the non-SCSI command is 1 byte, then byte_2 may hold the non-SCSI command, and byte_3 through byte_5 may hold don't-care-values. When the non-SCSI command is 2 bytes, then byte_2 and byte_3 may hold the non-SCSI command, and byte_4 and byte_5 may hold don't-care-values. When the non-SCSI command is 3 bytes, then byte_2 through byte_4 may hold the non-SCSI command, and byte_5 may hold a don't-care-value. When the non-SCSI command is 4 bytes, then byte_2 trough byte_5 may hold the non-SCSI command. Data associated with the non-SCSI command may be transmitted via Read Buffer Data of the Read Buffer command.

Figure 4:
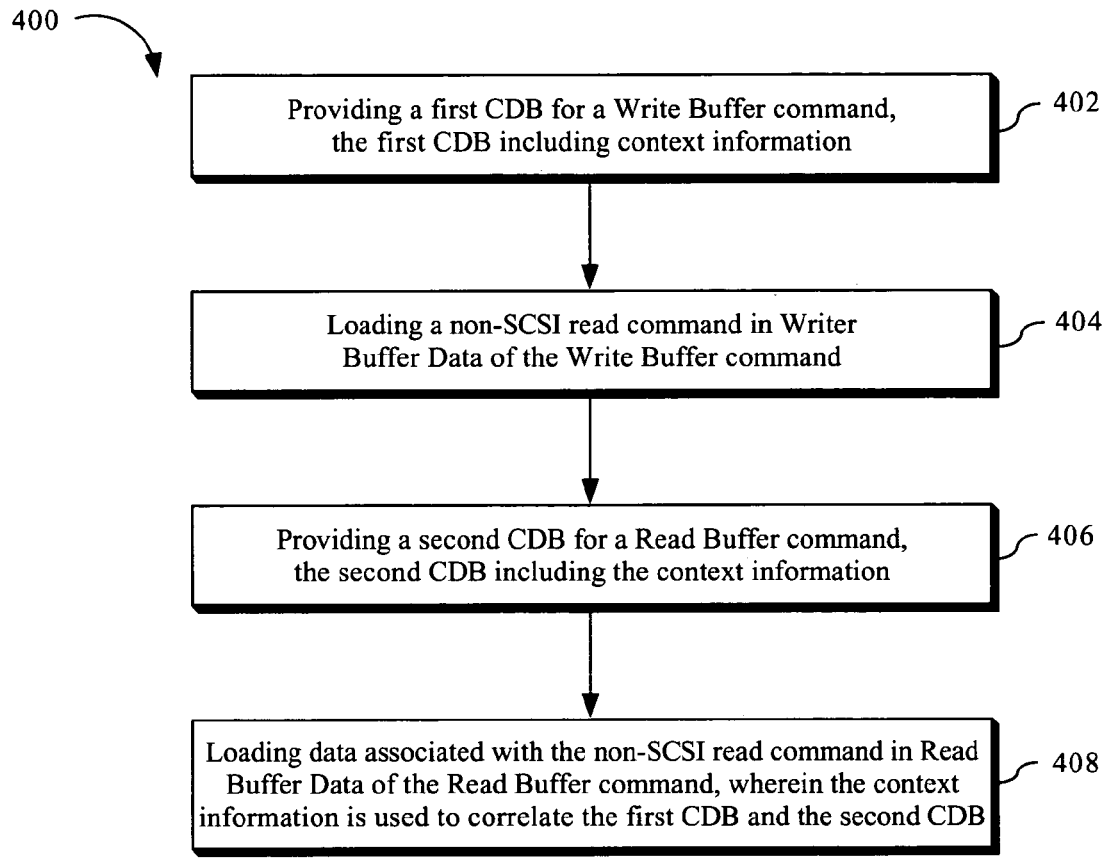
FIG. 4 is a flowchart of a method for transmitting a non-SCSI read command via SCSI commands in accordance with an exemplary embodiment of the present invention.

FIG. 4 is a flowchart of a method 400 for transmitting a non-SCSI read command via SCSI commands in accordance with an exemplary embodiment of the present invention. The method 400 may be implemented to transmit a non-SCSI read command such as a management command or the like when the non-SCSI read command is greater than a fixed number of bytes. A first CDB is provided for a Write Buffer command 402. The first CDB may be a 10-byte CDB, a 12-byte CDB, or the like. The first CDB includes context information. A non-SCSI read command is loaded in Writer Buffer Data of the Write Buffer command 404. A second CDB is provided for a Read Buffer command 406. The second CDB may be a 10-byte CDB, a 12-byte CDB, or the like. The second CDB includes the context information 406. The context information is used to correlate the first CDB and the second CDB to complete transmission of the non-SCSI read command. For example, the context information may include a tag and a time stamp. The tag may be provided by a driver or firmware of a device when an application registers itself with the device. The time stamp may indicate the time when a command is issued by the application. Those of ordinary skill in the art will understand that the context information may be implemented in other ways without departing from the scope and spirit of the present invention. Data associated with the non-SCSI read command is loaded in Read Buffer Data of the Read Buffer command 408.

Figure 5A:
FIGS. 5A and 5B illustrate a 10-byte CDB for a Write Buffer command and a 10-byte CDB for a Read Buffer command, respectively, which are used to transmit a non-SCSI read command in accordance with an exemplary embodiment of the present invention.
Figure 5B:

FIGS. 5A and 5B illustrate a 10-byte CDB 500 for a Write Buffer command and a 10-byte CDB 550 for a Read Buffer command, respectively, which are used to transmit a non-SCSI read command in accordance with an exemplary embodiment of the present invention. The non-SCSI read command may be a management command or the like. When the non-SCSI read command is greater than a fixed number of bytes (e.g., 4 bytes), the method 400 shown in FIG. 4 may be implemented in the CDB 500 and CDB 550. As shown in FIG. 5A, byte_0 is an opcode for the Write Buffer command, byte_1 is an opcode for the non-SCSI read command, and byte_2 through byte_5 includes context information. The non-SCSI read command itself is loaded in Write Buffer Data of the Write Buffer command. As shown in FIG. 5B, byte_0 is an opcode for the Read Buffer command, byte_1 is an opcode for the non-SCSI read command, and byte_2 through byte_5 includes the context information. Data associated with the non-SCSI read command is loaded in Read Buffer Data of the Read Buffer command. The context information in the CDB 500 is the same as the context information in the CDB 550 so that the context information may be used to correlate the CDB 500 and CDB 550 to complete transmission of the non-SCSI read command. For example, the context information may include a tag and a time stamp. The tag may be provided by a driver or firmware of a device when an application registers itself with the device. The time stamp may indicate the time when a command is issued by the application. Those of ordinary skill in the art will understand that the context information may be implemented in other ways without departing from the scope and spirit of the present invention.

Figure 6:
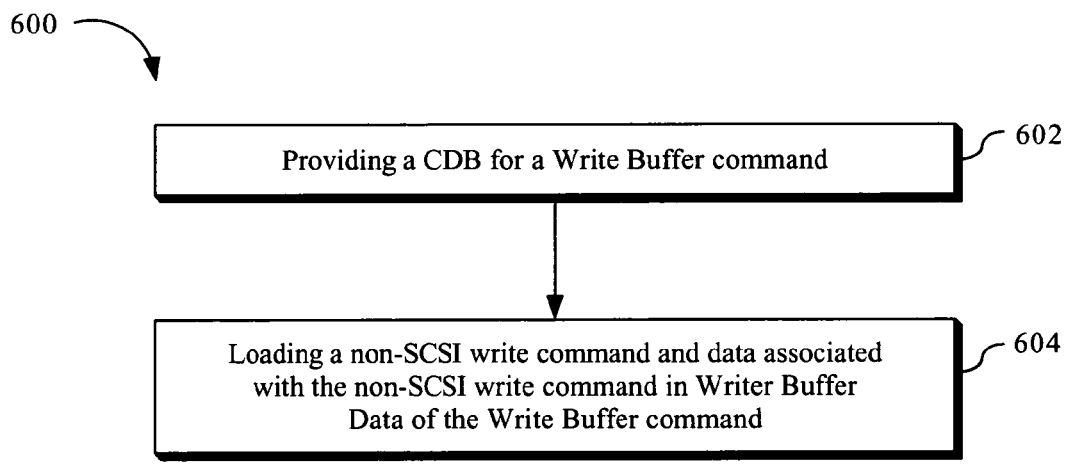
FIG. 6 is a flowchart of a method for transmitting a non-SCSI write command via SCSI commands in accordance with an exemplary embodiment of the present invention.

FIG. 6 is a flowchart of a method 600 for transmitting a non-SCSI write command via SCSI commands in accordance with an exemplary embodiment of the present invention. The method 600 may be implemented to transmit a non-SCSI write command such as a management command or the like when the non-SCSI write command is greater than a fixed number of bytes. A CDB is provided for a Write Buffer command 602. The CDB may be a 10-byte CDB, a 12-byte CDB, or the like. A non-SCSI write command (e.g., a non-_SCSI management command) and data associated with the non-SCSI write command are both loaded in Writer Buffer Data of the Write Buffer command 604.

Figure 7:
FIG. 7 illustrates a 10-byte CDB for a Write Buffer command which is used to transmit a non-SCSI write command in accordance with an exemplary embodiment of the present invention.

FIG. 7 illustrates a 10-byte CDB 700 for a Write Buffer command which is used to transmit a non-SCSI write command in accordance with an exemplary embodiment of the present invention. The non-SCSI write command may be a management command or the like. When the non-SCSI write command is greater than a fixed number of bytes (e.g., 4 bytes), the method 600 shown in FIG. 6 may be implemented in the CDB 700. As shown, byte_0 is an opcode for the Write Buffer command, and byte_1 is an opcode for the non-SCSI write command. The non-SCSI write command itself and data associated with the non-SCSI write command are loaded in Write Buffer Data of the Write Buffer command.

The present invention may also be used to transmit a SCSI command via SCSI commands without departing from the scope and spirit of the present invention. The present invention may transmit proprietary management commands to a target via SCSI commands. The target may be a SCSI target or an iSCSI target (e.g., an iSCSI RAID controller).

According to the present invention, when a transmitted command is a bi-directional command and the bi-directional command is not supported by an SCSI medium, the present invention may be used to transmit the bi-directional command. The bi-directional command may be transmitted in two phases (read and write), via SCSI commands (e.g., Read Buffer command and Write Buffer command).

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for transmitting a non-SCSI (non-Small Computer System Interface) read command via SCSI commands, comprising steps of providing a first CDB (Command Descriptor Block) for a Write Buffer command, said first CDB including context information, byte_0, of said first CDB is an opcode for said Write Buffer command;

embedding a non-SCSI read command in Writer Buffer Data of said Write Buffer command, byte 1 of said first CDB is an opcode for said non-SCSI read command; providing a second CDB for a Read Buffer command, said second CDB including said context information, byte_0, of said second CDB is an opcode for said Read Buffer command and byte_1, of said second CDB is an opcode for said non-SCSI read command; and embedding data associated with said non-SCSI read command in Read Buffer Data of said Read Buffer command, wherein said context information comprises an identifier unique to said first CDB and is used to correlate said first CDB and said second CDB to complete transmission of said non-SCSI read command.

2. The method of claim 1, wherein said first CDB and said second CDB are 10-byte CDBs.

3. The method of claim 1, wherein byte_2, byte_3, byte_4 and byte_5 of said second CDB includes said context information.

4. The method of claim 1, wherein said non-SCSI read command is a management command.

* * * * *